United States Patent [19]
Aoyagi et al.

[11] Patent Number: 5,394,384
[45] Date of Patent: Feb. 28, 1995

[54] REPRODUCING METHOD FOR EXCLUDING UNDESIRABLE TUNES BY OPERATING A SINGLE MANIPULATOR

[75] Inventors: Yoshio Aoyagi; Hiroyuki Abe, both of Saitama, Japan

[73] Assignee: Pioneer Electronic Corporation, Tokyo, Japan

[21] Appl. No.: 210,659

[22] Filed: Mar. 18, 1994

Related U.S. Application Data

[63] Continuation of Ser. No. 444,902, Dec. 4, 1989, abandoned.

[30] Foreign Application Priority Data

Dec. 5, 1988 [JP] Japan .................................. 63-306161

[51] Int. Cl.$^6$ .............................................. G11B 7/00
[52] U.S. Cl. .......................................... 369/32; 369/83; 369/30
[58] Field of Search ............... 369/32, 33, 30, 83, 369/84, 85; 360/13, 14, 72.1, 72.2, 137

[56] References Cited

U.S. PATENT DOCUMENTS

| | | | |
|---|---|---|---|
| 4,591,931 | 5/1986 | Baumeister | 360/72.1 |
| 4,779,252 | 10/1988 | Custers et al. | 369/33 |
| 4,805,050 | 2/1989 | Aoyagi et al. | 369/33 |
| 4,817,075 | 3/1989 | Kikuchi et al. | 369/33 |
| 4,872,151 | 10/1989 | Smith | 369/33 |
| 4,939,601 | 7/1990 | Endo et al. | 360/137 |

FOREIGN PATENT DOCUMENTS

| | | |
|---|---|---|
| 321660 | 6/1989 | European Pat. Off. . |
| 3235511 | 9/1982 | Germany . |
| 3629480 | 3/1988 | Germany . |
| 3733251 | 5/1988 | Germany . |
| 3826752 | 2/1989 | Germany . |

OTHER PUBLICATIONS

Patent Abstracts of Japan, P-455, May 13, 1986, vol. 10/No. 127 (Japanese Abstract Publication No. 60-253026).
Patent Abstracts of Japan, P-523, Jan. 8, 1987, vol. 11/No. 5 (Japanese Abstract Publication No. 61-182637).

*Primary Examiner*—Georgia Y. Epps
*Assistant Examiner*—Nabil Hindi
*Attorney, Agent, or Firm*—Richard C. Turner; Raymond H. J. Powell, Jr.

[57] ABSTRACT

An operation mode is first selected in which tunes recorded in a digital audio disk are sequentially reproduced. Reproduction-undesired tunes are selected by operating a manipulator for stopping reproduction of a currently reproduced tune and starting the next tune during every reproduction of the reproduction-undesired tunes so that their numbers are stored in a memory. In subsequent reproductions, the number of each tune going to be reproduced is compared with the numbers of the reproduction-undesired tunes stored in the memory and the tune is skipped if its number is included in the stored numbers.

11 Claims, 4 Drawing Sheets

REPRODUCING METHOD FOR EXCLUDING UNDESIRABLE TUNES BY OPERATING A SINGLE MANIPULATOR

This is a continuation of application No. 07/444,902, filed Dec. 4, 1989, now abandoned.

BACKGROUND OF THE INVENTION

The present invention relates to a method of reproducing optional ones of the pieces of program information recorded in a recording medium, and more particularly relates to a method in which pieces of program information not desired to be reproduced are selected in advance so that the selected pieces of program information are excluded from reproduction.

There is a conventional method of reproducing a plurality of pieces of program information recorded in a recording medium. In the method, some of the pieces of program information are selected and then registered in a memory in advance so as to be reproduced in the order of the registration. However, when the number of pieces of program information desired to be reproduced is large, the reproduction can be performed efficiently if pieces of program information not desired to be reproduced are selected out in advance. For that reason, in another conventional method of reproducing a plurality of pieces of program information, a deletion switch is provided in a reproduction apparatus so that the deletion switch is pressed down during the reproduction of a piece of program information to select it as the piece of program information not desired to be reproduced next time, to exclude the piece of program information from reproduction next time.

As for the conventional method in which the deletion switch is pressed down to select a piece of program information not desired to be reproduced, the reproduction of the piece of program information is still continued even after the deletion switch is pressed down to register the piece of program information being reproduced in a memory. For that reason, it is troublesome to further operate a manipulator in order to stop the reproduction of the currently reproduced piece of program information and start the reproduction of the next piece of program information. Besides, the number of such manipulators needs to be made as small as possible for a vehicle-mounted reproduction apparatus in order to reduce the size and weight thereof.

SUMMARY OF THE INVENTION

Accordingly, it is an object of the present invention to provide a recorded information reproduction method in which pieces of program information not desired to be reproduced are selected by using an existing manipulator, namely, without providing another manipulator in addition.

In a recorded information reproduction method provided in accordance with the present invention, optional pieces of program information recorded in a recording medium are selected in advance so as to be excluded from reproduction. The selection of the piece of program information is performed during the reproduction of the piece of program information to be selected by operating a manipulator which functions to sequentially select, i.e., jump to the next piece of program information as the manipulator is pressed down repeatedly.

To select the reproduction-undesired pieces of program information from among the pieces recorded in the recording medium and then register those in a memory, a mode in which pieces of program information recorded in the recording medium are sequentially reproduced is first selected, and the manipulator for stopping the reproduction of the currently reproduced piece of program information and starting the reproduction of the next piece of program information is then operated during every reproduction of the reproduction-undesired pieces of program information so that data indicating the currently reproduced piece of program information, such as a program information number, are stored in the memory. At that time, the original function of the manipulator, which is to stop the reproduction of a piece of program information being reproduced and start the reproduction of the next piece of program information from the head position thereof by jumping the rest of the former piece of program information, is also performed. For that reason, it is easy to select the pieces of program information not desired to be reproduced. At the time of next reproduction, the number of each piece of program information going to be reproduced is compared with the program information numbers stored in the memory. When the compared numbers are coincident with each other, the piece of program information is regarded as not desired to be reproduced and the procedure moves to the next piece of program information. Only the pieces of program information desired to be reproduced can thus be reproduced sequentially.

DETAILED DESCRIPTION OF THE INVENTION

Embodiments of the present invention are hereafter described in detail with reference to the drawings attached hereto.

Figure 1:
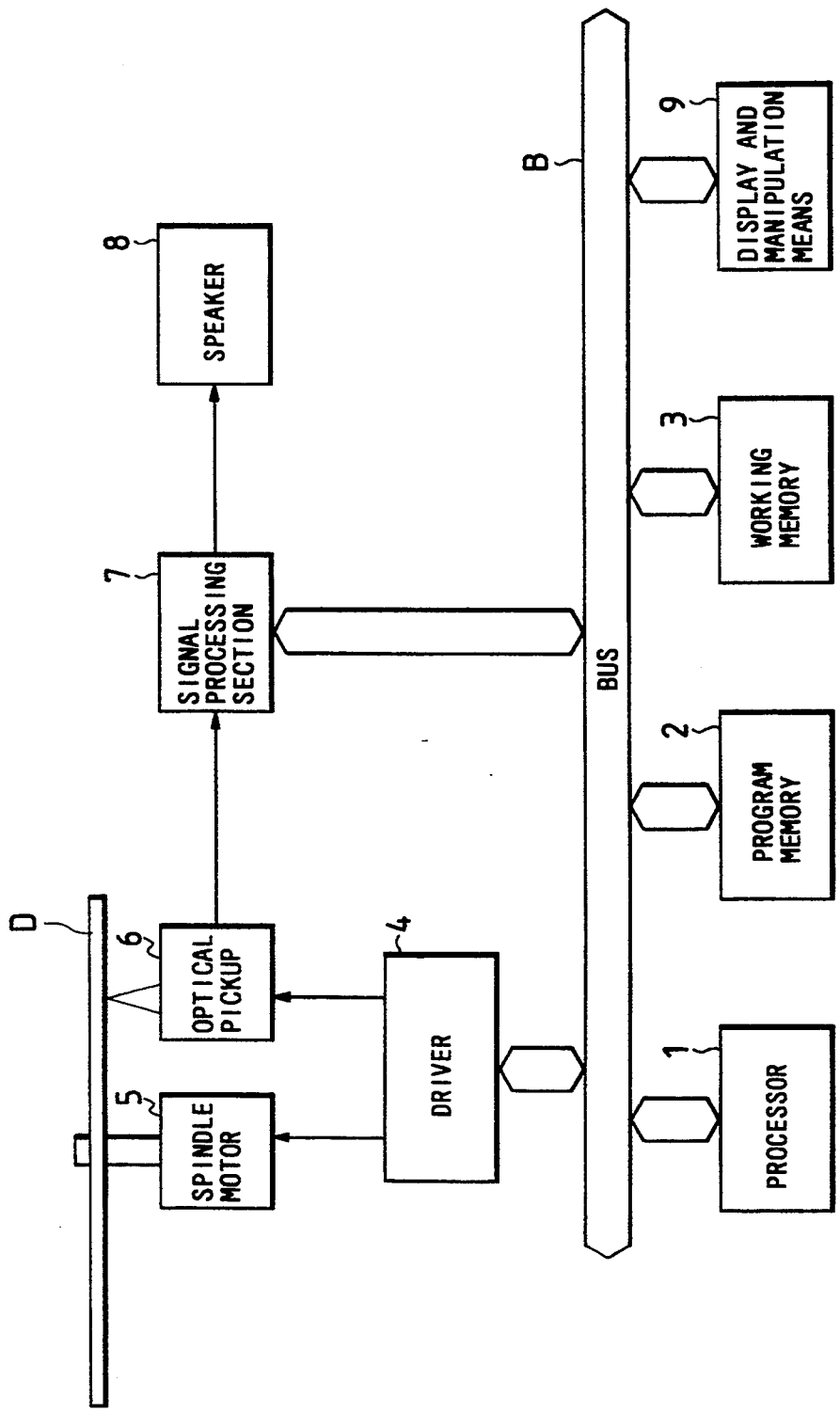
FIG. 1 is a block diagram of a digital audio disk player to which the present invention is applied.

FIG. 1 is a block diagram of a digital audio disk player to which the invention is applied. In this figure, circuits of the disk player are controlled by a processor 1 through a bus B to reproduce program information (hereinafter referred to as music information) recorded in a disk D. The control is performed in accordance with a program stored in a program memory 2. A working memory 3 is provided to temporarily store data to be processed by the processor 1. Part of the sections of the working memory 3 are used to register selected ones of the plural pieces of music information recorded in the disk D. The disk D is rotated at a fixed linear velocity by a spindle motor 5 controlled by a driver 4. If the disk player is a compact disk player, the fixed linear velocity is 1.2 m/sec to 1.4 m/sec and the rotational frequency of the disk D is about 500 rpm at the inner circumferential edge of the disk and about 200 rpm at the outer circumferential edge of the disk.

The information recorded in the disk D is read by an optical pickup 6 so that the information is converted into a radio frequency signal which is sent out to a signal processing section 7. The signal processing section 7 amplifies the radio frequency signal, converts it into a binary signal, and divide it into a music signal and a control signal such as a synchronizing signal. The music signal is subjected to error correction processing, and thereafter is subjected to digital-to-analog conversion. A signal resulting from the digital-to-analog conversion is processed through a low-pass filter, the output from which is supplied as an audio signal to a speaker 8.

The optical pickup 6 is controlled by the driver 4 so as to be subjected to focusing control, tracking control and optical system feeding control. The focusing control is for focusing a laser beam on the disk D. The tracking control is for causing the laser beam to follow the track on the disk D in the circumferential direction thereof. The optical system feeding control is for moving the optical pickup 6 in the radial direction of the disk D.

A display and manipulation means 9 includes player control manipulators such as a reproduction switch for reproducing the music information recorded in the disk D, a stop switch for stopping the reproduction, a track search switch for sequentially selecting the pieces of music information as the track search switch is repeatedly pressed down, a beginning part monitor switch for sequentially reproducing the beginning parts of the respective pieces of music information in a prescribed time for each of the pieces, and a memory switch for selecting a memory mode. The display and manipulation means 9 also includes display units such as indicators for showing that the manipulators have been operated, and indicators for showing the number and reproduction time of the piece of music information being reproduced.

Figure 2:
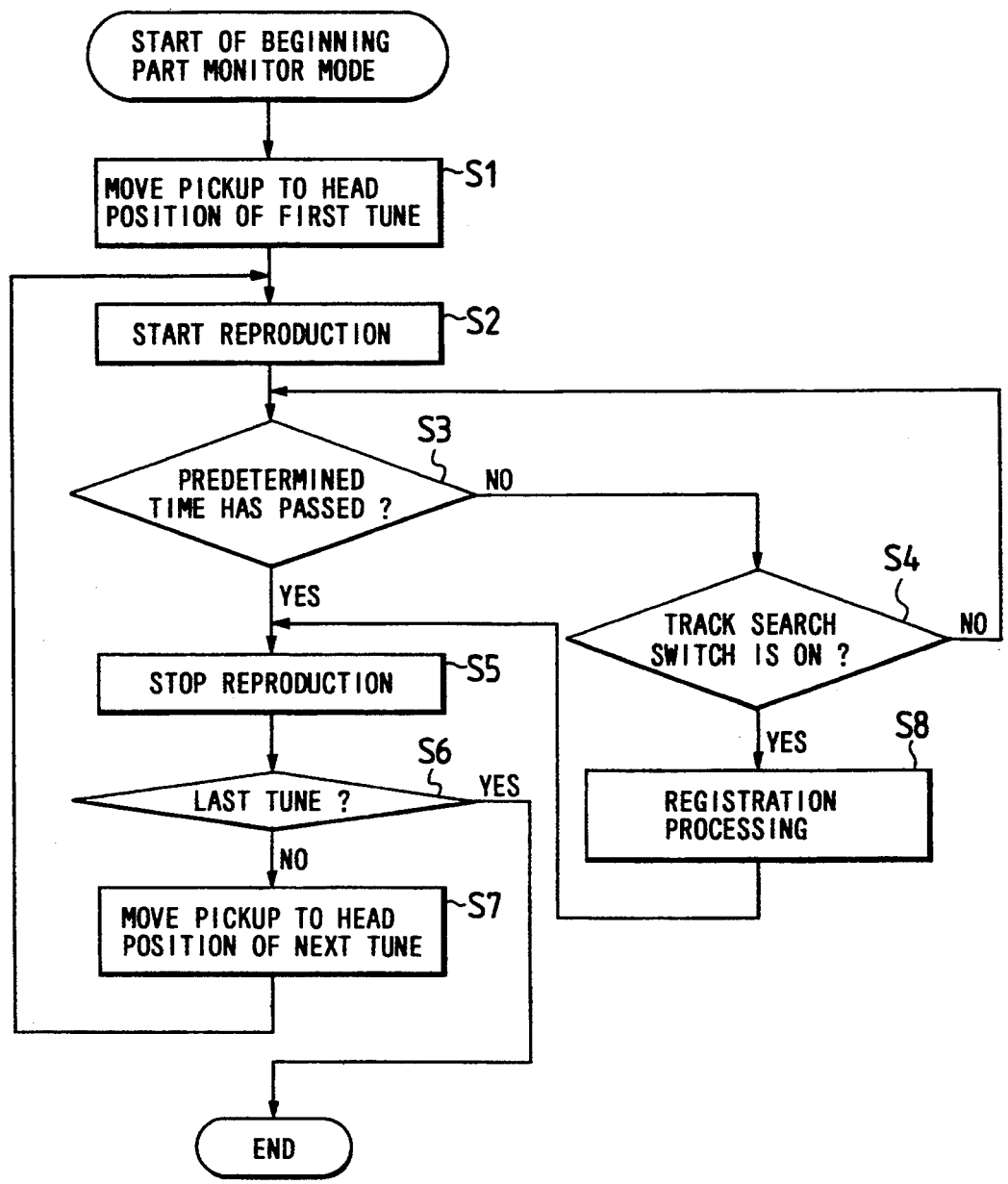
FIG. 2 is a flow chart of a reproduction-undesired tune selection processing according to a first embodiment of the invention.
Figure 3:
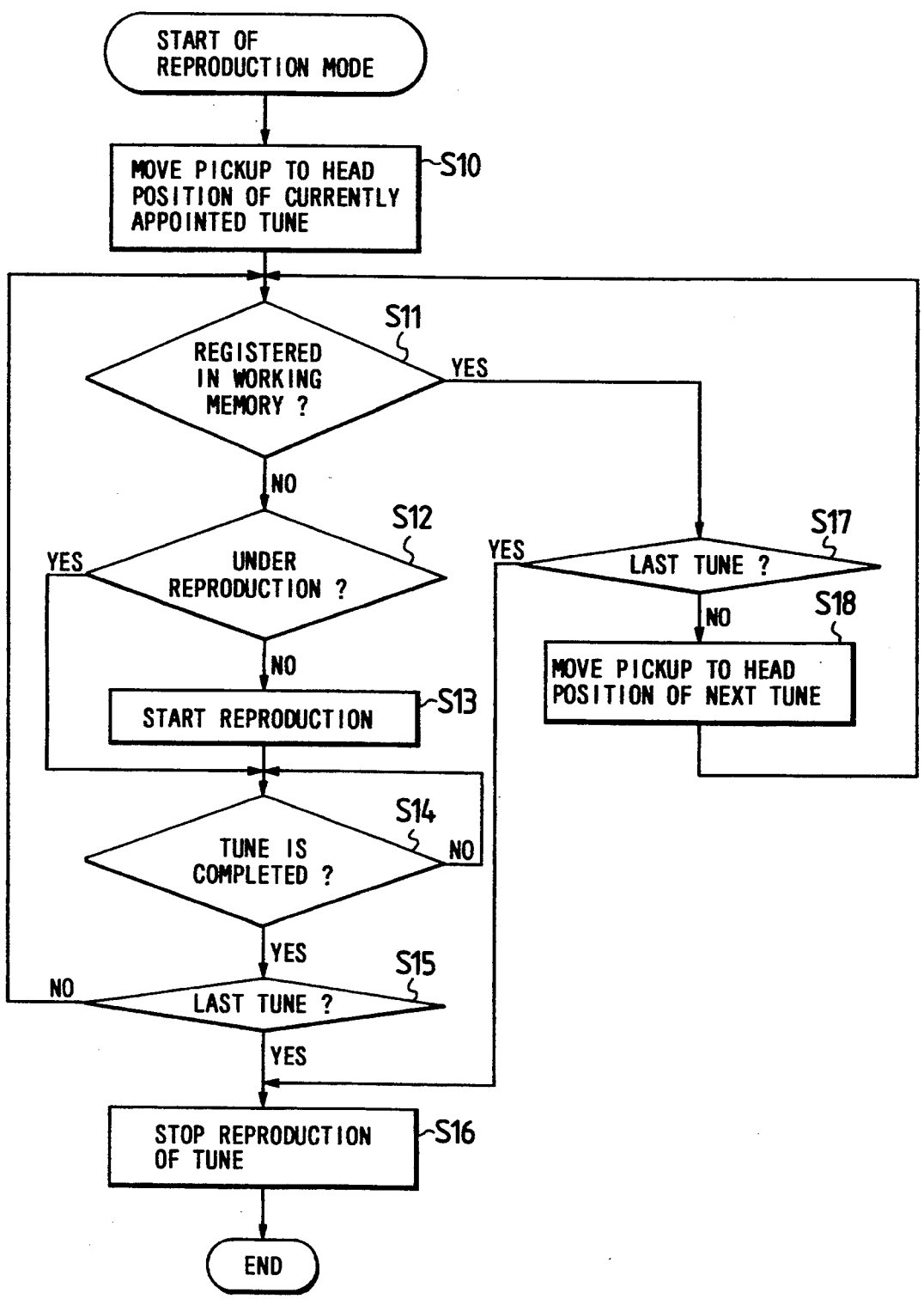
FIG. 3 is a flow chart of a reproduction processing according to the first embodiment.

The operation of the above disk player according to a first embodiment of the invention is described with reference to flow charts in FIGS. 2 and 3. It is first described with reference to the flow chart in FIG. 2 how, from among the plural pieces of music information (hereinafter referred to as tune) recorded in the disk D, tunes not desired to be reproduced are selected and then registered as excluded tunes in the working memory 3, in a beginning part monitor mode. It is assumed in the description hereinafter that the disk D is already loaded on the disk player, and TOG (Table of Contents) information recorded in the lead-in area of the disk and indicative of the number of tunes recorded in the disk, positions (addresses) of the starts, halfway border points and ends of the respective tunes on the disk, reproduction times of the respective tunes, a total reproduction time of all the tunes, and so forth, are already read by the optical pickup 6 and stored in the prescribed sections of the working memory 3.

When the beginning part monitor switch of the display and manipulation means 9 is pressed down, the disk player is put in the beginning part monitor mode in which the beginning parts of all the tunes recorded in the disk D are sequentially reproduced during a prescribed time period, such as ten seconds, for each of the beginning parts. In this mode, the processor 1 controls the driver 4 so that the optical pickup 6 is moved to the head position of a first tune in step S1, and the reproduction of the first tune is started in step S2. The reproduction is performed either at a normal speed, or at such a high speed as to be able to recognize the contents of the tune, which makes it possible to identify the tune within a predetermined short time. The reproduction at the high speed is enabled by causing the optical pickup 6 to repeat jumping from one of mutually adjacent tracks to the other at a prescribed period.

In step S3, it is judged whether or not the prescribed time has passed. If it is not judged in step S3 that the prescribed time has passed, a judgement in step S4 as to whether or not the track search switch has been pressed down is repeated until it is judged in step S3 that the prescribed time has passed. The repetition of the judgement in step S4 is for selecting the currently reproduced tune and then registering it as a reproduction-undesired tune in the memory 3 in order to exclude the tune from reproduction. If it is not judged in step S4 until a lapse of the predetermined time that the track search switch has been pressed down, it is decided that the first tune reproduced has not been selected to be excluded from reproduction. The reproduction of the first tune is stopped in step S5. It is judged in step S6 whether or not the tune is the last to be reproduced. If it is not judged in step S6 that the tune is the last to be reproduced, the optical pickup 6 is moved to the head position of the next tune on the disk D in step S7, and the reproduction of the next tune is started in step S2. If it is judged in step S6 that the tune is the last to be reproduced, the disk player is put out of the beginning part monitor mode.

If it is judged in step S4 that the track search switch has been pressed down, a processing for registering the currently reproduced tune as the reproduction-undesired tune in the working memory 3 is performed in step S8. For the registration, the number of the currently reproduced tune is read from the TOC information already stored in the working memory 3 and is then stored in another prescribed area in the memory 3, which is indicated by an address pointer. After the registration of the reproduction-undesired tune, i.e., the tune to be excluded from reproduction, is performed, step S5 is taken to stop the reproduction of the tune, and step S6 is then taken.

Reproduction of the tunes recorded in the disk D is described with reference to the flow chart of FIG. 3. When the reproduction switch of the display and manipulation means 9 is pressed down, the disk player is put in a reproduction mode. The optical pickup 6 is moved to the head position of the currently appointed tune in step S10. It is judged in step S11 through the comparison of the tune numbers whether or not the current tune is a one registered in the working memory 3 as a tune to be excluded from reproduction. If the judgement in step S11 is NO, it is judged in step S12 whether or not the current tune is being reproduced as a result of start of the reproduction mode. If the judgement in step S12 is NO, the reproduction of the tune is started in step S13. After it is judged in step S14 that the reproduction of the tune is completed, it is judged in step S15 whether or not the tune is the last to be reproduced. If the judgement in step S15 is NO, step S11 is taken again to judge whether or not the next tune is a one registered in the working memory 3 as a tune to be excluded from reproduction, and the above-mentioned processing is then repeated. If it is judged in step S15 that the tune is the last to be reproduced, the reproduction of the tune is stopped in step S16 and the disk player is put out of the reproduction mode.

If it is judged in step S11 that the current tune is a one registered in the working memory 3 as a tune to be excluded from reproduction, a processing for not reproducing the tune is performed because the tune is not desired to be reproduced. It is judged in step S17 whether or not the tune is the last to be reproduced. If the judgment in step S17 is NO, the optical pickup 6 is moved to the head position of the next tune in step S18, step S11 is taken to judge whether or not the next tune is a one registered in the working memory 3 as a tune to be excluded from reproduction, and the above-mentioned processing is performed. If it is judged in step S17 that the tune is the last to be reproduced, step S16 is taken and the disk player is thereafter switched out of the reproduction mode.

Figure 4:
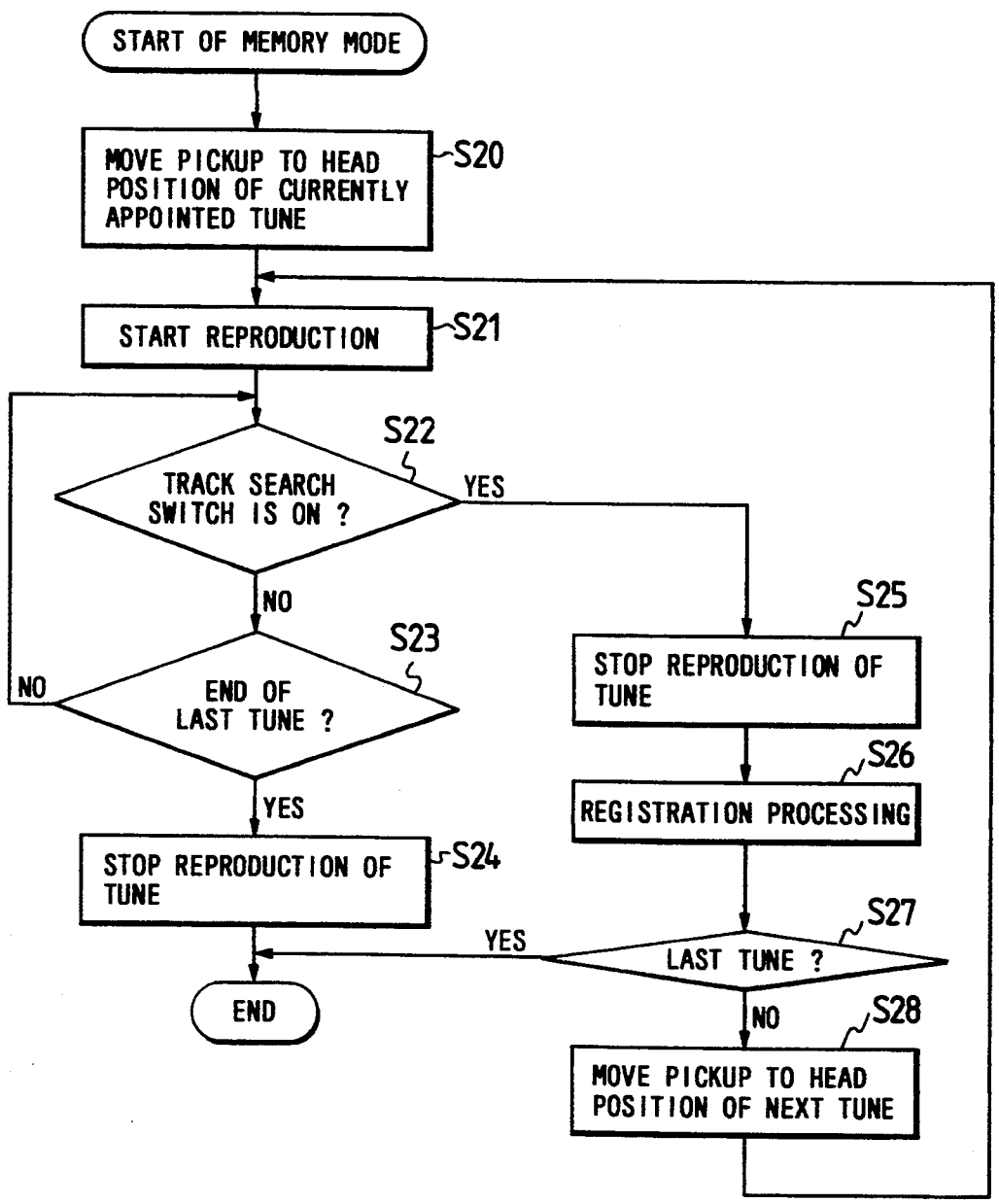
FIG. 4 is a flow chart of a reproduction-undesired tune selection processing according to a second embodiment of the invention.

FIG. 4 is a flow chart of processing according to a second embodiment of the invention, by which tunes not desired to be reproduced are selected for exclusion from reproduction. In this embodiment, tunes are selected while the disk player is in a normal reproduction mode. When the reproduction switch of the display and manipulation means 9 is pressed down, the disk player is put in the reproduction mode. The optical pickup 6 is moved to the head position of a currently appointed tune on the disk D in step S20 and the reproduction of the tune is started in step S21. A judgement whether or not the track search switch of the means 9 has been pressed down is repeated in steps S22 and S23 until the reproduction of the last tune is completed. If the pressing of the track search switch has not been judged in steps S22 and S23, reproduction of the tune is stopped in S24 after the completion of the reproduction of the last tune, thus ending the processing.

If it is judged in step S22 that the track search switch has been pressed down, the reproduction of the tune is stopped in step S25 and the tune is registered as a reproduction-undesired tune in the working memory 3 in step S26. It is then judged in step S27 whether or not the current tune registered in the memory 3 is the last to be reproduced. If the judgement in step S27 is NO, the optical pickup 6 is moved to the head position of the next tune in step S28 and the reproduction of the next tune is started in step S21. If it is judged in step S27 that the current tune is the last to be reproduced, the processing is ended.

In this embodiment, the disk player needs to be put in a memory mode in advance by a manipulator such as the memory switch in order to distinguish the above processing from a normal track search and make it possible to select the to-be-excluded tunes by operating the track search switch.

Although the above-described embodiments are applied to the digital audio disk player, the present invention is not confined thereto but may be otherwise embodied for application to other apparatuses such as a digital audio tape recorder to produce the same effects as the preceding embodiments.

In accordance with the present invention, program information not desired to be reproduced can be selected by an existing manipulator, so that an exclusively used manipulator such as a deletion switch does not need to be provided. Besides, the original function of the manipulator can be used to stop the reproduction of the program information being reproduced and start the reproduction of the next program information by jumping the rest of the former program information. This function is analogous to an image of excluding the program information from reproduction. Therefore, the program information not desired to be reproduced can be selected by the existing manipulator without feeling a sense of incongruity.

What is claimed is:

1. In a recorded information reproduction method in which optional pieces of program information are selected in advance from among a plurality of pieces of program information recorded in a recording medium, and the optional pieces of program information are excluded in a reproduction operation, the improvement comprising the step of:

selecting each of said optional pieces of program information by operating, during reproduction thereof, a single manipulator which functions, upon operation thereof, to stop reproduction of a current piece of program information, to store information corresponding to excluded program information and to start reproduction of a next piece.

2. A recorded information reproduction method as claimed in claim 1, wherein said selecting step for selecting optional pieces of program information is performed during an operation mode in which only respective beginning parts of said plurality of pieces of program information are sequentially reproduced in a predetermined period for each of said plurality of pieces.

3. A recorded information reproduction method in which optional pieces of program information are selected in advance from among a plurality of program information recorded in a recording medium, and the optional pieces of program information are excluded in a reproduction operation, comprising the steps of:

(a) selecting said optional pieces of said program information, said selecting step comprising the steps of:
  (i) starting an operation mode in which pieces of program information recorded in said recording medium are sequentially reproduced;
  (ii) selecting one of said optional pieces of program information by operating, during reproduction thereof, a manipulator which functions, upon operation thereof, to stop reproducing a current piece of program information and start reproducing a next piece;
  (iii) storing data indicative of said one of said optional pieces in memory means for storing said data;
  (iv) repeating said selecting step (ii) and said storing step (iii) until completion of selection of said optional pieces of program information; and
(b) reproducing said plurality of pieces of program information excluding said optional pieces by performing for every piece of program information a judgment whether a current piece is included in said optional pieces using a collection of said data stored in said memory means, and skipping reproduction of said current piece if said current piece is included in said optional pieces.

4. A recorded information reproduction method as claimed in claim 3, wherein said starting step further comprises starting an operation mode in which pieces of program information recorded in said recording medium are sequentially reproduced for a predetermined period.

5. In a recorded information reproduction method in which optional pieces of program information are selected in advance from among a plurality of pieces of program information recorded in a recording medium, and the optional pieces of program information are excluded in a reproduction operation, the improvement comprising the step of:

selecting each of said optional pieces of program information by performing sub-steps for:
(a) stopping reproduction of a respective one of said optional pieces of said program information upon recognition of operation of a single switch:
(b) automatically storing information corresponding to excluded program information; and
(c) automatically starting reproduction of a next one of said optional pieces.

6. The recorded information reproduction method as claimed in claim 5, wherein said selecting step is performed during an operation mode in which only respective beginning parts of said plurality of pieces of program information are sequentially reproduced for a predetermined period.

7. The recorded information reproduction method as claimed in claim 6, wherein said predetermined period is approximately 10 seconds.

8. The recorded information reproduction method as claimed in claim 5, wherein said sub-step (b) comprises automatically storing information corresponding to excluded program information in means for storing.

9. The recorded information reproduction method as claimed in claim 5, further comprising the step of setting an operating mode wherein only respective beginning parts of said plurality of pieces of program information are sequentially reproduced for a predetermined period for each of said plurality of pieces, wherein said setting step is performed before said selecting step is performed.

10. The recorded information reproduction method as claimed in claim 5, further comprising the step of setting an operating mode wherein only respective beginning parts of said plurality of pieces of program information are sequentially reproduced for a predetermined period of time for each of said plurality of pieces, wherein said setting step is completed before said selecting step is performed, and wherein said selecting step is repeatedly performed until a last one of said plurality of pieces has been reproduced.

11. A recorded information reproduction method in which optional pieces of program information are designated in advance from among a plurality of pieces of program information recorded in a recording medium, and in which the optional pieces of program information are excluded in a subsequent reproduction operation, comprising the steps of:

reproducing a short segment of each of said plurality of pieces of program information;

during said reproduction of each short segment, recognizing a predetermined input signal as a selection signal designating that piece of program information as one of said optional pieces of program information;

in response to said selection signal, stopping reproduction of the then reproduced piece of program information and storing information listing that piece of program information as one of said optional pieces of program information which will be excluded during subsequent reproduction;

automatically starting reproduction of a next one of said short segments; and subsequent to the reproduction of all of said short segments, reproducing said pieces of program information in their entirety, with said optional pieces of program information being excluded.

* * * * *